United States Patent
Feraud et al.

(10) Patent No.: US 9,429,225 B2
(45) Date of Patent: Aug. 30, 2016

(54) EPICYCLIC REDUCTION GEAR, NOTABLY FOR TURBOMACHINE

(71) Applicant: HISPANO-SUIZA, Colombes (FR)

(72) Inventors: Benjamin Feraud, Rueil-Malmaison (FR); Guillaume Beck, Chantilly (FR); Boris Morelli, Paris (FR); Jordane Peltier, Paris (FR)

(73) Assignee: HISPANO SUIZA, Colombes (FR)

( * ) Notice: Subject to any disclaimer, the term of this patent is extended or adjusted under 35 U.S.C. 154(b) by 11 days.

(21) Appl. No.: 14/423,931

(22) PCT Filed: Sep. 3, 2013

(86) PCT No.: PCT/FR2013/052016
§ 371 (c)(1),
(2) Date: Feb. 25, 2015

(87) PCT Pub. No.: WO2014/037659
PCT Pub. Date: Mar. 13, 2014

(65) Prior Publication Data
US 2015/0192199 A1 Jul. 9, 2015

(30) Foreign Application Priority Data
Sep. 4, 2012 (FR) .................... 12 58231

(51) Int. Cl.
*F16H 57/04* (2010.01)

(52) U.S. Cl.
CPC ........ *F16H 57/0479* (2013.01); *F16H 57/045* (2013.01); *F16H 57/0435* (2013.01); *F16H 57/0442* (2013.01); *F16H 57/0486* (2013.01)

(58) Field of Classification Search
CPC ............. F16H 57/0435; F16H 57/045; F16H 57/0479
See application file for complete search history.

(56) References Cited

U.S. PATENT DOCUMENTS

| | | | |
|---|---|---|---|
| 3,469,656 A | 9/1969 | Benthake et al. | |
| 3,539,035 A * | 11/1970 | Wolkenstein | F16H 57/0482 184/13.1 |
| 5,102,379 A * | 4/1992 | Pagluica | F16H 1/2836 475/159 |
| 7,252,615 B2 * | 8/2007 | Kempf | F16H 57/043 475/159 |
| 8,491,436 B2 * | 7/2013 | Duong | F16H 57/042 475/159 |

(Continued)

FOREIGN PATENT DOCUMENTS

| | | |
|---|---|---|
| DE | 38 07 954 | 9/1989 |
| DE | 10 2004 021 967 | 11/2005 |

(Continued)

OTHER PUBLICATIONS

International Search Report Issued Nov. 5, 2013 in PCT/FR2013/052016 Filed Sep. 3, 2013.
U.S. Appl. No. 14/425,446, filed Mar. 3, 2015, Feraud.

*Primary Examiner* — Tisha Lewis
(74) *Attorney, Agent, or Firm* — Oblon, McClelland, Maier & Neustadt, L.L.P

(57) ABSTRACT

An epicyclic reduction gear, for example for a turbomachine, including a device forming a fluid circulation passage configured to generate a pressure drop, created by stacking at least two elements. Each element includes a passage for carrying fluid configured to generate a pressure drop and including an inlet and an outlet. The outlet, or inlet, of the passage of one of the elements is, respectively, connected to the inlet, or to the outlet, of the passage of the other element.

9 Claims, 5 Drawing Sheets

(56) References Cited

U.S. PATENT DOCUMENTS

| 9,021,778 B2 * | 5/2015 | Kupratis | F02C 7/36 60/39.162 |
|---|---|---|---|
| 2006/0223664 A1 | 10/2006 | Duong et al. | |
| 2007/0010365 A1 | 1/2007 | Schmitt | |
| 2009/0084448 A1 | 4/2009 | Lowery | |
| 2012/0302391 A1 | 11/2012 | Duong et al. | |

FOREIGN PATENT DOCUMENTS

| EP | 1 703 174 | 9/2006 | |
|---|---|---|---|
| FR | 2 340 465 | 9/1977 | |
| FR | 2 888 301 | 1/2007 | |
| SU | 724806 | 3/1980 | |
| WO | wo2014037652 a3 * | 3/2014 | F16H 57/04 |

* cited by examiner

EPICYCLIC REDUCTION GEAR, NOTABLY FOR TURBOMACHINE

The present invention relates to an epicyclic reduction gear, in particular for a turbomachine, comprising a device forming a fluid circulation passage adapted to generate a pressure drop.

BACKGROUND OF INVENTION

An epicyclic conventionally comprises an internal sun gear and an external sun gear which are coaxial, with the internal sun gear being movable in rotation about its axis, with the external sun gear being stationary, with at least one planet gear being mounted to be movable in rotation on a planet carrier and meshing with both the internal sun gear and the external sun gear, with the planet carrier being able to pivot about the axis of the internal sun gear and the external sun gear. The inlet is typically formed by the internal sun gear and the outlet is formed by the planet carrier. The outer planet is also called an orbit gear.

In a turbomachine, epicyclic reduction gears are used in particular as speed reducers for reducing the speed of rotation of the fan rotor, regardless of the rotational speed of the turbine.

The document EP 1703174 describes such an epicyclic reduction gear, wherein the sprocket wheels forming the planet gears are mounted on pivots of the planet carrier by means of journal bearings. In other words, the planet carrier comprises cylindrical pivots engaged in the cylindrical holes of the planet gears. The reducer further comprises an oil supply passage opening at the interface between said cylindrical surfaces. In operation, a layer of oil must be present at the interface, in order to prevent seizing.

The journal bearings are generally lighter, less bulky and more reliable than bearings using rolling elements and they have a almost infinite service life, provided they are constantly supplied with oil and the oil contains no abrasive particle.

In case of failure in the oil supply circuit, for example in case a pump failure, the oil supply to the journal bearing must be maintained long enough to start an auxiliary pump or to stop the turbomachine, for example. This period amounts, for example to several tens of seconds.

For this purpose, the document EP 1703174 provides for the forming of accumulators in the planet carrier, with each accumulator being able to supply oil to a journal bearing in case of failure, for a given duration. The structure of such accumulators and the locations thereof make the production of the planet carrier difficult and increase the dimensions and the mass thereof.

Furthermore, controlling the oil flow supplied to the journal bearing in case of breakdown is relatively difficult. In particular, the flow rate should be relatively low so as to be able to supply oil for a sufficiently long time, while being sufficient to prevent seizing.

A passage with a small diameter is generally used to limit a fluid flow rate. In this application, however, a passage having a sufficiently small diameter over a relatively long length (e.g. a length of approximately 100 times the diameter of the passage) is not only difficult to realize but it is also subject to clogging by particles contained in the oil circuit. Another solution would be to use a strainer at the inlet of the passage so as to limit the flow rate but in this case too, a risk of clogging of the strainer by the particles exists.

SUMMARY OF INVENTION

The invention more particularly aims at providing a simple, efficient and cost-effective solution to this problem.

For this purpose, the invention provides a device forming a fluid circulation passage adapted to generate a pressure drop, created by stacking at least two elements, with each element comprising a fluid circulation passage adapted to generate a pressure drop and comprising an inlet and an outlet, with the outlet, respectively the inlet of the passage of one of the elements being connected to the inlet, respectively to the outlet of the passage of the other element.

Such individual elements are easily achieved and form, after assembly, a continuous passage formed of the series of passages of the various assembled elements. The higher the number of elements the more significant the pressure drop in the passage of the device. Besides, the passage of each element does not necessarily have a much reduced section, which makes it possible to prevent the clogging of the device by particles present in the fluid.

The device preferably comprises means for positioning the elements relative to each other.

At least one of the elements may then include a centering pin cooperating with a complementary recess of an adjacent element.

The inlet or the outlet of a passage of an element is thus guaranteed to be opposite the outlet or the inlet of the passage of the adjacent element. The continuity of the passage of the device is thus ensured.

Advantageously, the passage of each element has the general shape of a labyrinth and comprises at least one bent area, which makes it possible to increase the pressure drops without having to reduce the passage section.

According to one embodiment of the invention, the passage of at least one of the elements has a recess intended to trap particles.

The particles are thus trapped by the device and are discharged downstream, for example at a journal bearing.

In addition, each element may comprise two opposite surfaces, with the passage being formed at one of the surfaces, with the inlet or the outlet of the passage comprising a hole going through said element and opening on the other surface.

Elements having such structures are relatively easy to manufacture.

Besides, the device may comprise several cylindrical elements having the same structure, with the inlet and the outlet of the passage of each said element being angularly spaced apart by a predetermined angle, with the positioning means making it possible to angularly move two adjacent elements by the same angle value.

The invention further relates to an epicyclic reduction gear, particularly for a turbomachine, comprising an internal sun gear and an external sun gear, which are coaxial, with the internal sun gear being movable in rotation about its axis, with the external sun gear being stationary, with at least one planet gear being mounted to be movable in rotation on a planet carrier and meshing with both the internal sun gear and with the external sun gear, with the planet carrier being able to pivot about the axis of the internal sun gear and the external sun gear, the planet gear having a cylindrical inner surface mounted to be movable in rotation around a cylindrical surface of the planet carrier, with the reduction gear further comprising means for supplying oil to the interface between said cylindrical surfaces, characterized in that the oil supplying means comprises a chamber provided in the planet carrier, intended to form a buffer volume of oil, and having a so-called lower zone spaced from the axis of rotation of the planet carrier, a so-called upper zone close to the axis of rotation of the planet carrier, at least one main passage opening at said interface and at the upper zone, and at least one secondary passage opening at said interface and at the lower zone, with said secondary passage comprising a device of the aforementioned type.

In operation, under the effect of a centrifugal force, the oil present in the chamber is forced radially outward. The chamber provided in the planet carrier therefore fills in the lower area spaced from the axis of rotation of the planet carrier first, and then in the upper area.

In normal operation, i.e. in the absence of failure in the oil supplying circuit, the oil flow which enters the chamber is high and the oil level thus reaches the upper area of said chamber. The oil can then escape through the main passage to supply the journal bearing, i.e. the interface between the cylindrical surfaces of the planet carrier and of the planet gear.

It should be noted that, given its size, the secondary passage will not let the whole oil flow through, so that, in normal operation, the chamber fills.

In case of failure, the flow of oil that enters the chamber becomes null and the volume of oil in the chamber decreases and no longer reaches the upper area: the oil can no longer escape through the main passage, but only through the secondary passage. The oil flow feeding the journal bearing is thus reduced, but is sufficient to prevent seizing of the bearing for a limited period of time necessary for example for starting an auxiliary pump or stopping the turbomachine (degraded operation of the journal bearing).

The invention further makes it possible to provide a secondary passage having a pressure loss sufficiently high and controlled to generate a low flow of oil in case of failure, while avoiding the risk of clogging of the secondary passage by particles contained in the oil.

The recess preferably extends from the passage of the corresponding element in a direction opposite the axis of rotation of the planet carrier, so as to be able to trap particles by centrifugation.

Besides, each element has a first surface facing the axis of rotation of the planet carrier and a second surface opposite the first surface, with the passage of each element being formed at the first surface, with the outlet of said passage having a hole going through said element and opening on the second surface.

BRIEF DESCRIPTION OF DRAWINGS

The invention will be better understood, and other details, features and advantages of the invention will appear upon reading the following description given by way of a non restrictive example while referring to the appended drawings wherein.

DETAILED DESCRIPTION OF INVENTION

Figure 1:
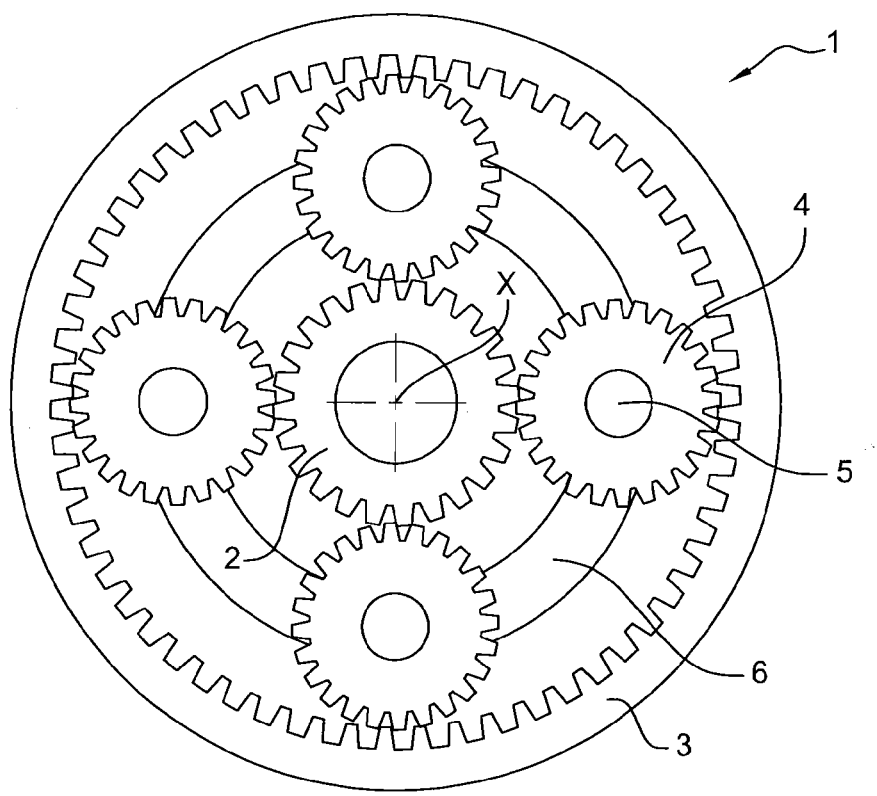
FIG. 1 is a schematic front view of an epicyclic gear.
Figure 2:
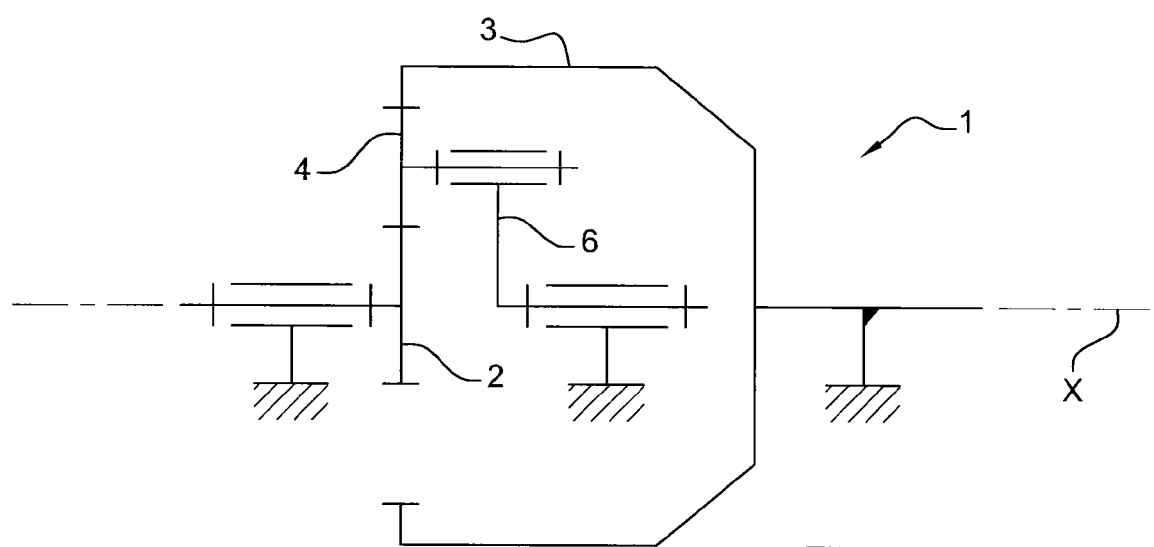
FIG. 2 is a kinematic diagram of an epicyclic gear.

FIGS. 1 and 2 schematically illustrate the structure of an epicyclic reduction gear 1 according to the invention. The latter conventionally comprises an internal sun gear 2 (also called the sun) and an external sun gear 3 (also called an orbit gear) which are coaxial. The internal sun gear 2 is movable in rotation about its axis, with the external sun gear 3 being stationary. The reduction gear further comprises planet gears 4 mounted to be movable in rotation on pivots 5 of a planet carrier 6. Each planet gear 4 meshes with both the internal sun gear 2 and with the external sun gear 3. The planet carrier 6 is able to pivot about the axis X of the internal sun gear 2 and the external sun gear 3.

The inlet is formed by the internal sun gear 2 and the outlet is formed by the planet carrier 6.

In a turbomachine, epicyclic reduction gears are used in particular as speed reducers for reducing the speed of rotation of the fan rotor, regardless of the rotational speed of the turbine.

Figure 3:
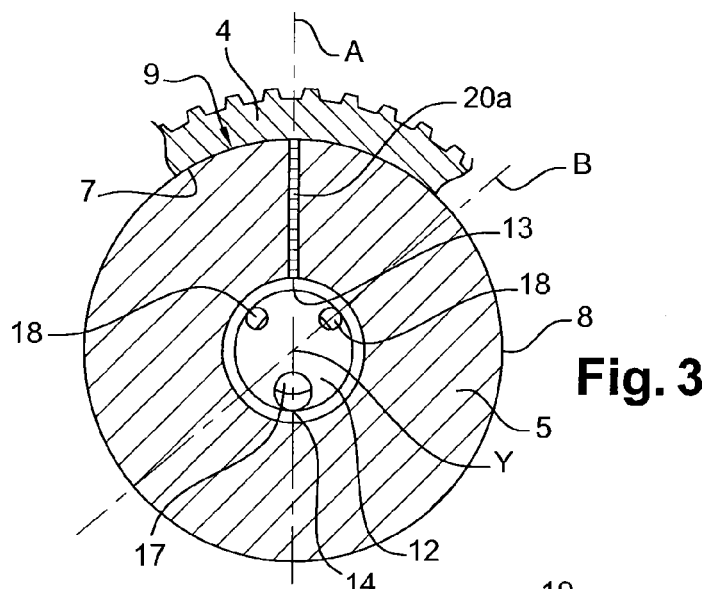
FIG. 3 is a cross-sectional view of a portion of a planet carrier and a planet gear of a reduction gear according to the invention.
Figure 4:
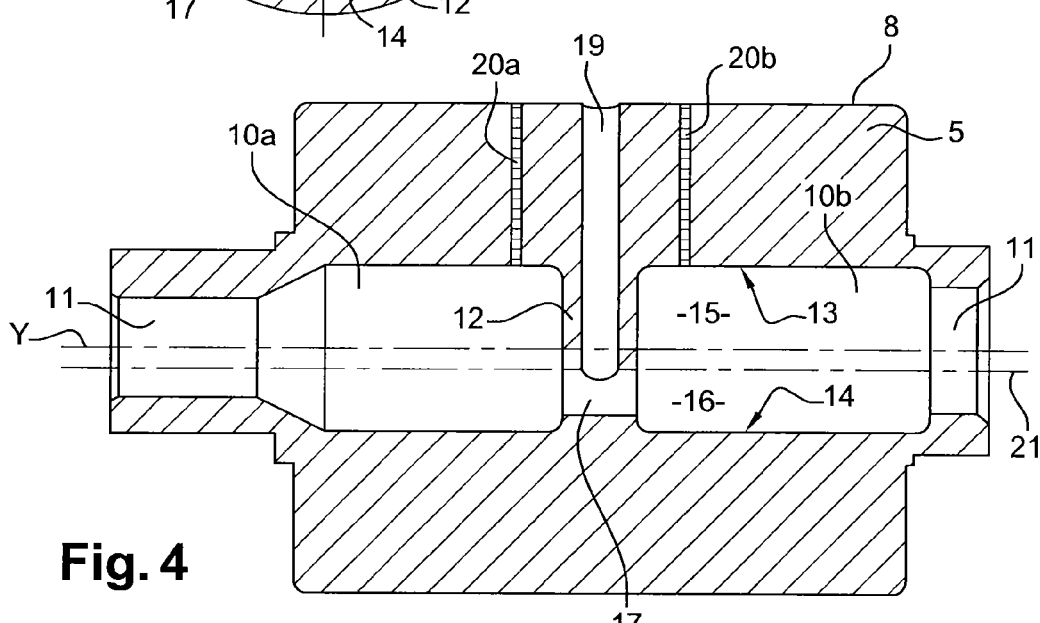
FIGS. 4 and 5 are views in longitudinal section of a part of the planet carrier, respectively along lines A and B of FIG. 3.
Figure 5:
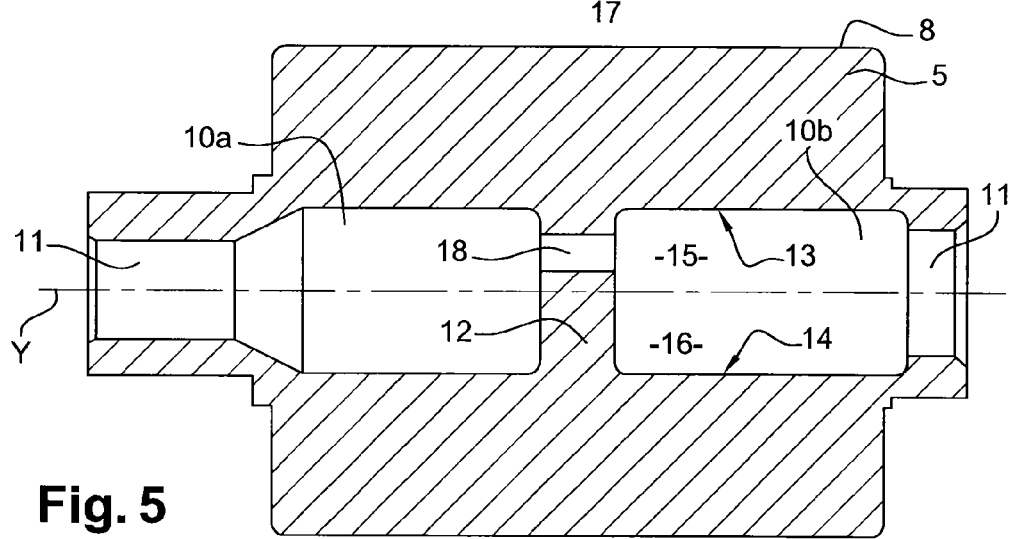
Figure 6:
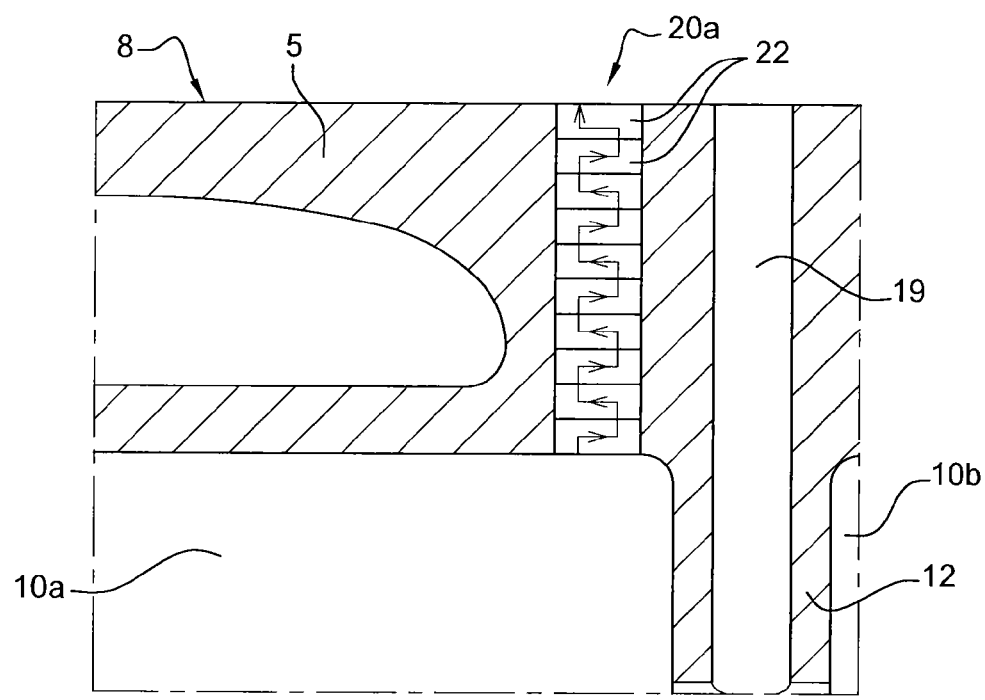
FIG. 6 is a detailed sectional view of a part of the planet carrier wherein the device according to the invention is mounted.

As best seen in FIGS. 3 to 5, each planet gear 4 includes a cylindrical inner surface 7 mounted to pivot about a cylindrical surface 8 of the pivot 5 corresponding to the planet carrier 6 so as to form a journal bearing.

The interface 9 between the two cylindrical surfaces 7, 8 therefore must be supplied with oil. For this purpose, the reducer 1 comprises supplying means comprising a chamber 10 which substantially extends along the Y axis of each pivot 5, with at least one of the ends 11 of the chamber 10 being connected to an oil inlet passage. If only one of the ends 11 forms an oil inlet, the other end is plugged.

The chamber 10 is globally cylindrical and more particularly comprises two parts 10a, 10b separated by a central partition wall 12 which extends radially. The side ends 11 of the chamber 10 are provided with holes having a smaller diameter than the chamber 10, with at least one such hole forming an oil inlet, as indicated above.

The line bearing reference number 13 forms the so-called lower point of the chamber 10, i.e. the furthest point away from the axis of rotation of the planet carrier 6. Conversely, the line bearing reference number 14 forms the so-called upper point of the chamber 10, i.e., the closest point to the X axis of rotation of the planet carrier 6. Similarly, the so-called upper and lower areas bear reference numbers 15 and 16 respectively. The X axis lies in the A section plane of FIG. 3 but is not visible in FIGS. 3 to 5.

In operation, under the effect of the centrifugal force generated by the rotation of the planet carrier 6, oil is pushed radially outwardly back into the chamber 10. Therefore the lower area 15 of the chamber 10 fills first, and then the upper area 16.

A hole 17 opening into the upper areas 16 of the portions 10a, 10b of the chamber 10 goes through the central wall 12. Two holes 18 opening in the lower areas 15 of the portions 10a, 10b of the chamber 10 further go through the central wall 12. The holes 18 are located on either side of the A plane of FIG. 3, i.e. on either side of the radial plane passing through the X axis of rotation of the planet carrier 6 and through the Y axis of the chamber 10 and of the corresponding pivot 5. The diameter of each hole 18 may be smaller than the diameter of the hole 17

A main passage 19 extends radially into the central partition wall 12 and opens at the outer cylindrical wall 8 of the pivot 5 and the hole 17.

In the embodiment of FIGS. 3 to 5, each portion 10a, 10b of the chamber 10 further comprises a secondary passage 20a, 20b which extends radially and opens at the outer cylindrical wall 8 of the pivot 5 and opens at the lower point 13 of the corresponding part 10a, 10b of the chamber 10.

The section of each secondary passage 20a, 20b is smaller than the section of the main passage 19.

In normal operation, oil enters the chamber 10 at a sufficient rate for the oil level to be located in the upper area 16 of the chamber 10. The oil volume is equal in both parts 10a, 10b of the chamber 10, due to the holes 18 and through the hole 17.

The oil then enters the main passage 19 and is supplied to the interface 9 by centrifugation.

The section of the main passage 19 is sized so as to obtain, at the interface 9, an oil film the thickness of which corresponds to the specifications imposed or calculated to obtain a correct operation of the journal bearing and avoid any seizing phenomenon.

In case of failure, the oil volume rapidly decreases until it reaches the level bearing reference number 21 in FIG. 3, from which oil can no longer enter the main passage 19, through the hole 17. From that moment, oil cannot escape (under the effect of centrifugation) but through the secondary passages 20a, 20b. During this phase of degraded operation, a sufficient oil rate reaches the interface 9 via the secondary passages 20a, 20b, so as to prevent seizing of the journal bearing for a given period, for example of the order of 30 seconds. This period must be sufficient to enable for example restarting an auxiliary pump or stopping the engine. The sections of the secondary passages 20a, 20b are thus so determined as to allow such a degraded mode for the desired time.

Figure 7:
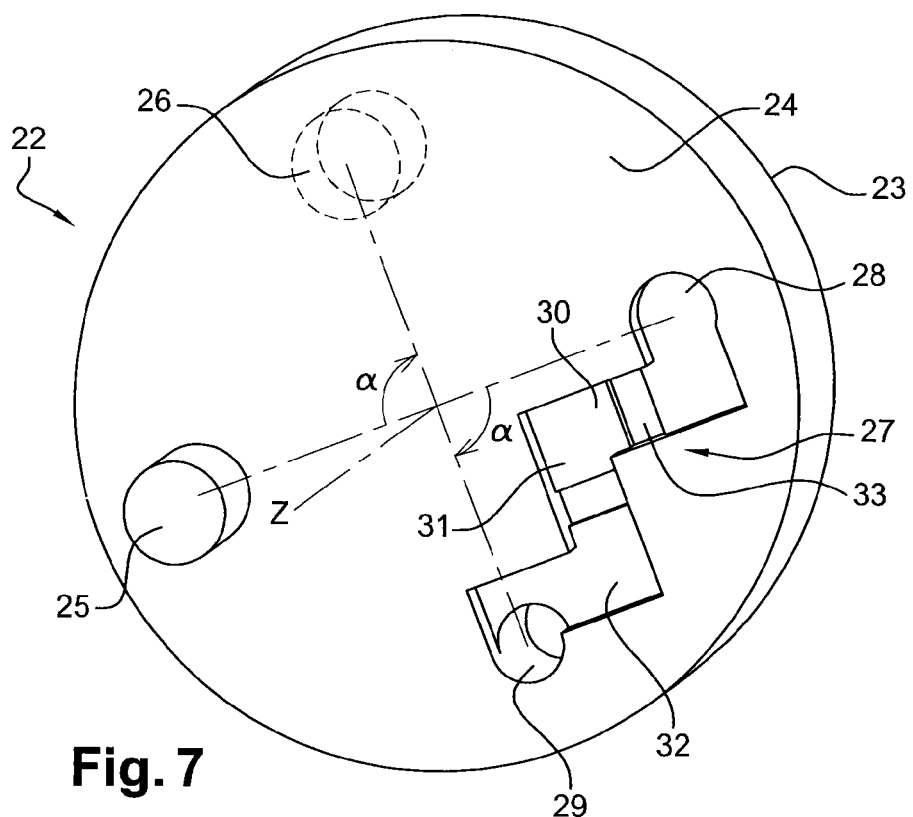
FIGS. 7 and 8 are perspective views of an element of the device according to the invention.
Figure 8:
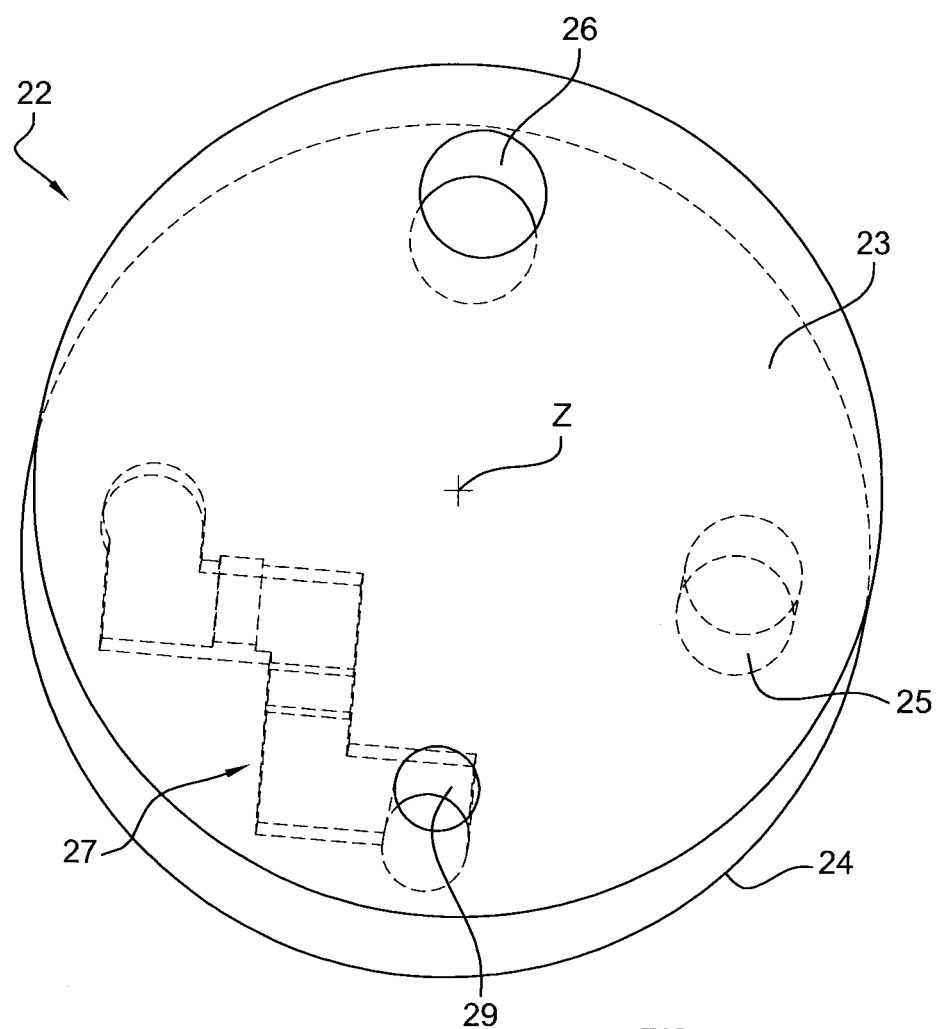

As best seen in FIGS. 6 to 9, each secondary passage 20a, 20b is formed by a device comprising a stack of a plurality of identical elements 22, with the structure of an element 22 being shown in FIGS. 7 and 8.

Each element 22 has a generally cylindrical shape and comprises a so-called lower face 23 remote from the X axis of rotation of the planet carrier 6, and a so-called upper opposite face 24, close to the X axis. Both faces 23, 24 are parallel to each other. The axis of each element 22 bears Z reference.

A centering pin 25 protrudes from the upper face 24, with a recess 26 having a matching shape being formed in the lower face 23. Alternately, the reverse may be provided.

A passage 27 is further formed in the upper face 24 on a portion of the thickness of the element 22. The passage 27 has a globally rectangular or square section. It comprises an inlet 28 and an outlet 29 connected by a first, a second and a third successive straight portions bearing the respective reference numbers 30, 31, 32. The first portion 30 is connected to the inlet 28. The second portion 31 extends substantially perpendicularly to the first part 30 so as to form a first bend. Similarly, the third portion 32 extends substantially perpendicularly to the second part 31 to form a second bend. The third portion 32 is further connected to the outlet 29. The latter is formed by a hole going through the element 22 and opening at the lower face 23 of the element 22.

The first part 30 and the second part 31 each comprise a recess 33 extending over the entire width of the corresponding portion 30, 31. Each recess 33 extends toward the lower face 23, from the bottom of the passage 27.

The bottom wall of each recess 33 may be generally oblique to the lower 23 and upper 24 faces of the element 22, with the deepest recessed area being then situated on the inlet 28 side.

The inlet 28 and outlet 29 of the passage 27 are angularly shifted relative to one another by an angle α with respect to the Z axis. In the example shown in the figures, this angle α is of the order of 90°. The pin 25 and the recess 26 are also shifted by the same angle value a.

As indicated above, the device is realized by stacking several identical elements 22. The pin 25 of an element 22 is thus engaged in the recess 26 of an adjacent element 22 and the outlet 29 of the passage 27 of an element 22 is located opposite the inlet 28 of a passage 27 of an adjacent element 22, to form a continuous secondary passage 20a, 20b.

It should be noted that the elements 22 positioned at the ends of the stack may have a different structure from the other ones. As a matter of fact, said so-called upper element, i.e. the element of the stack which is the closest to the X axis, may have no pin 25. In addition, the so-called lower element, i.e. the element which is the furthest from the X axis, may have no recess 26.

In addition, the various elements stacked 22 can be held using suitable fastening means (not shown), such as for example a system consisting of opposite shoulder and flange, stopping means of the circlip type or a screw system. In an alternative solution, the elements 22 can be shrunk in a hole of the pivot 5. Such fastening means make it possible to maintain the lower 23 and upper 24 faces of the various elements 22 in contact, so as to ensure some tightness of the secondary passage 20a, 20b.

Figure 9:
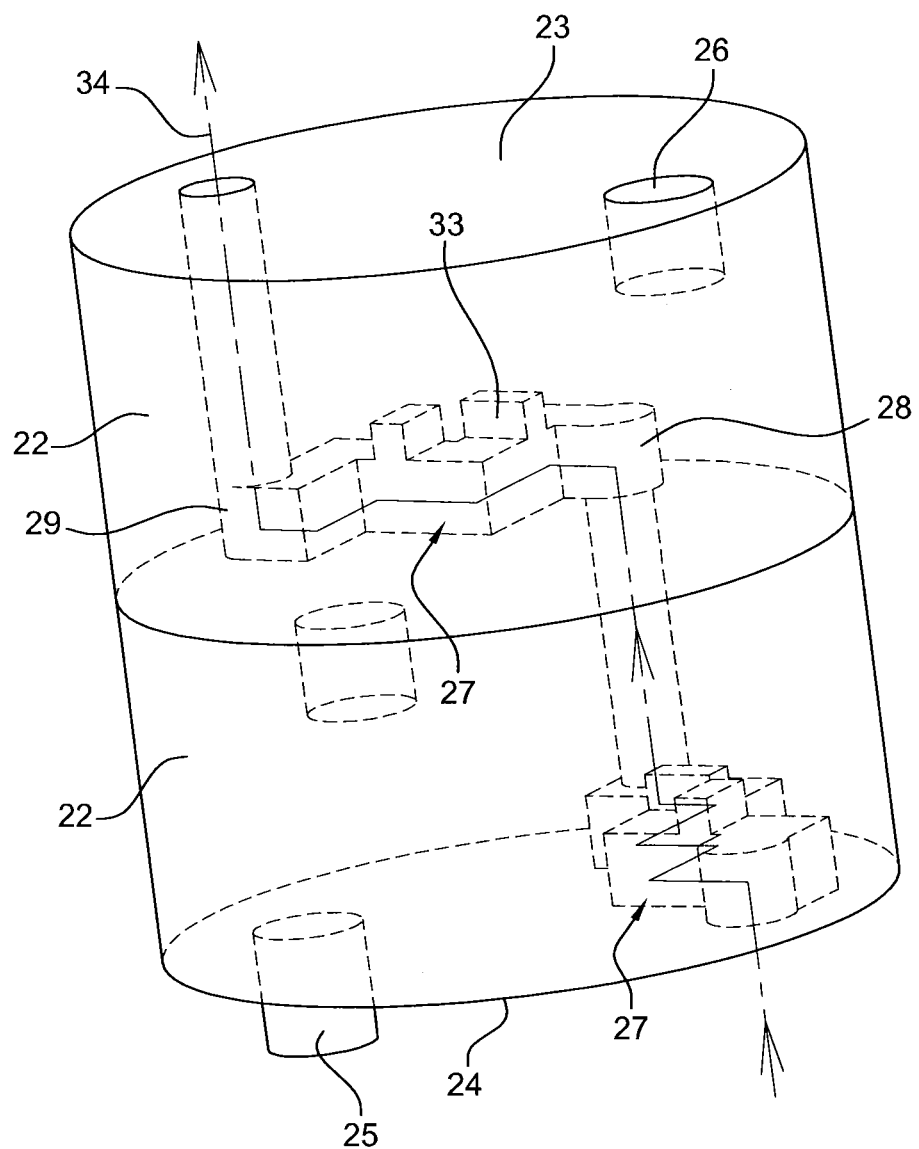
FIG. 9 is a perspective view illustrating the stacking of two identical elements.

In operation, during a breakdown, the oil enters through the inlet 28 of the upper element 22, moves forward in the passages 27 of the various successive elements 22 and escapes through the lower outlet 29 of the element 22 so as to supply the interface 9, as shown by the arrow 34 in FIG. 9. The successive bends of the elements 22 cause pressure drops, so as to obtain a limited oil flow in the secondary passage 20a, 20b, while having a sufficiently large passage section to avoid any clogging by particles contained in the oil. Furthermore, in operation, such particles are trapped in the recesses by centrifugation 33, so as to avoid their being drawn to the interface 9.

The invention claimed is:

1. An epicyclic reduction gear, or an epicyclic reduction gear for a turbomachine, comprising:
    an internal sun gear and an external sun gear, which are coaxial, with the internal sun gear being movable in rotation about its axis, with the external sun gear being stationary;
    at least one planet gear mounted to be movable in rotation on a planet carrier and meshing with both the internal sun gear and with the external sun gear, the planet carrier configured to pivot about the axis of the internal sun gear and the external sun gear, the planet gear including a cylindrical inner surface mounted to be movable in rotation around a cylindrical surface of the planet carrier;
    means for supplying oil to an interface between the cylindrical surfaces;
    wherein the oil supplying means comprises a chamber provided in the planet carrier, configured to form a buffer volume of oil, and including a lower zone spaced from the axis of rotation of the planet carrier, an upper zone closer to the axis of rotation of the planet carrier, at least one main passage opening at the interface and at the upper zone, and at least one secondary passage opening at the interface and at the lower zone,
    the secondary passage comprising a device configured to generate a pressure drop, obtained by stacking at least two elements, with each element comprising a fluid circulation passage configured to generate a pressure drop and comprising an inlet and an outlet, with the outlet, respectively the inlet of the passage of one of the elements being connected to the inlet, respectively to the outlet of the passage of the other element.

2. A reduction gear according to claim 1, wherein the device configured to generate a pressure loss comprises means for positioning the elements with respect to one another.

3. A reduction gear according to claim 2, wherein at least one of the elements comprises a centering pin cooperating with a complementary housing of an adjacent element.

4. A reduction gear according to claim 1, wherein the passage of each element has a general shape of a labyrinth and comprises at least one bent region.

5. A reduction gear according to claim 1, wherein the passage of at least one of the elements includes a recess configured to trap particles.

6. A reduction gear according to claim 1, wherein each element comprises two opposite surfaces, with the passage being formed at one of the surfaces, with the inlet or the outlet of the passage comprising a hole going through the element and opening on the other surface.

7. A reduction gear according to claim 2, comprising plural cylindrical elements having a same structure, with the inlet and the outlet of the passage of each one of the elements being angularly spaced by a determined angle, with the positioning means configured to angularly shift two adjacent elements by a same angle value.

8. A reduction gear according to claim 5, wherein the recess extends from the passage of the corresponding element in a direction opposite the axis of rotation of the planet carrier, configured to trap particles by centrifugation.

9. A reduction gear according to claim 6, wherein each element includes a first surface facing the axis of rotation of the planet carrier and a second surface opposite the first surface, with the passage of each element being formed at the first surface, with the outlet of the passage having a hole going through the element and opening on the second surface.

* * * * *